Sept. 13, 1927.  1,642,217
H. R. SHOOPMAN ET AL
ENGINE
Filed May 27, 1925   3 Sheets-Sheet 1
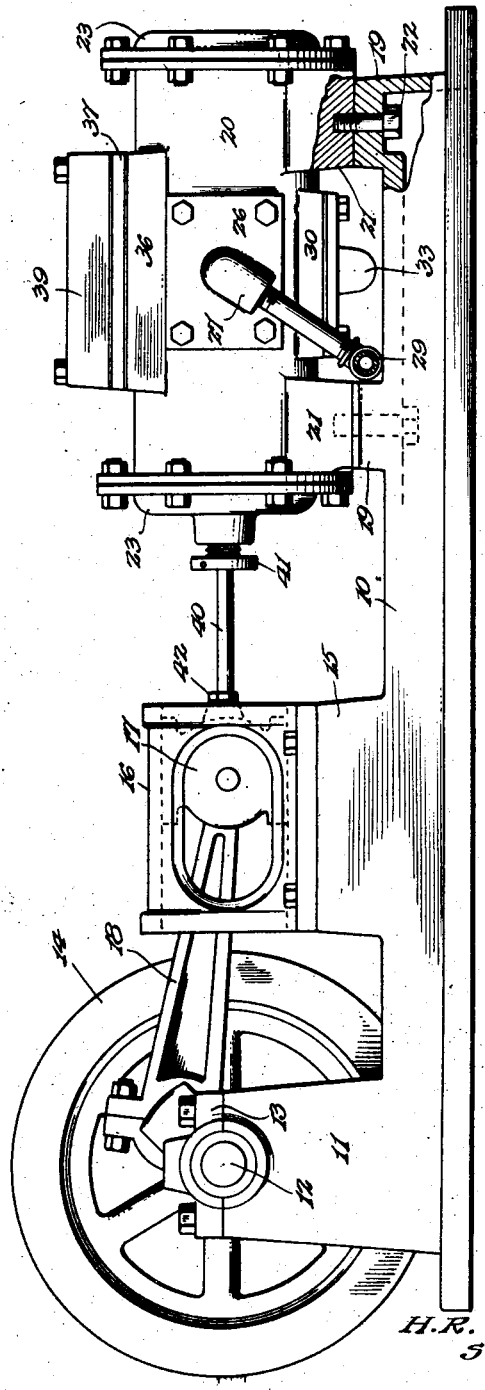
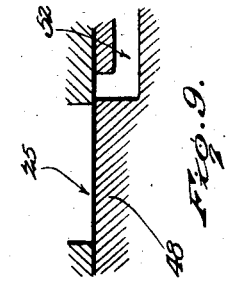
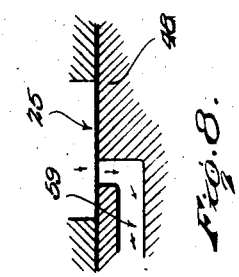
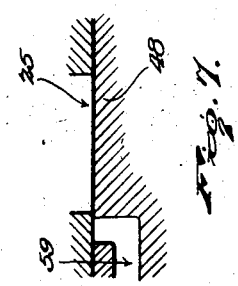
Inventors
H. R. Shoopman.
S. Shindo.
By
Lacey & Lacey, Attorneys

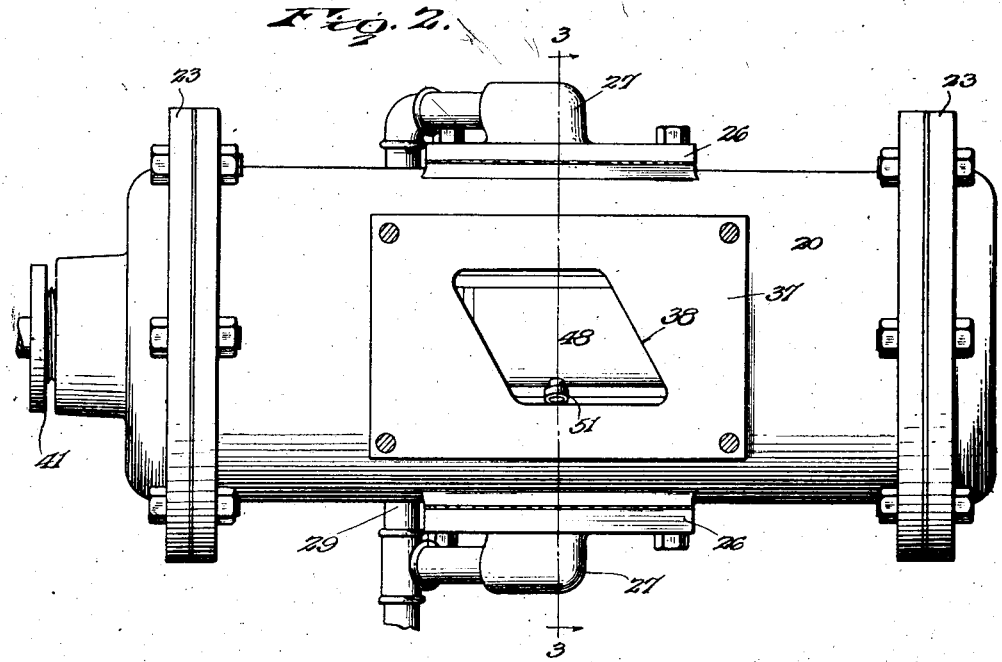
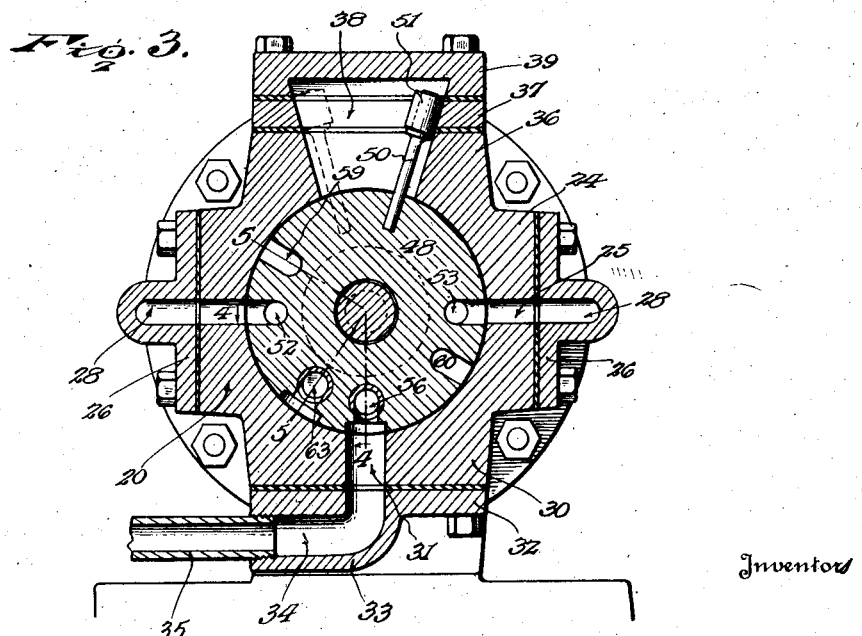

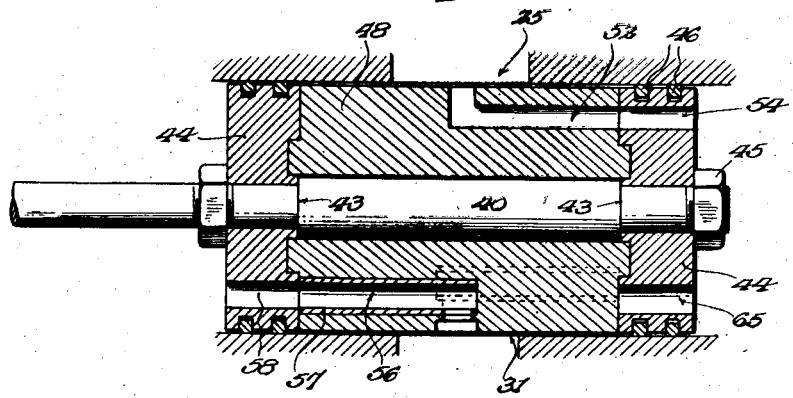

Patented Sept. 13, 1927.

1,642,217

UNITED STATES PATENT OFFICE.

HENRY R. SHOOPMAN AND SABURO SHINDO, OF GRAND ISLAND, NEBRASKA.

ENGINE.

Application filed May 27, 1925. Serial No. 33,229.

This invention relates to an improved engine and seeks, among other objects, to provide an engine wherein the usual sliding valves for controlling admission and exhaust of the motive fluid will be eliminated.

The invention seeks, as a further object, to provide an engine embodying a novel valve mechanism for controlling admission and exhaust of the motive fluid.

A still further object of the invention, in this connection, is to provide an engine employing a single valve to control both the admission and exhaust of the motive fluid, and wherein the valve will be mounted on the piston.

Another object of the invention is to provide an engine wherein, instead of oscillating the piston, as has heretofore been done, to effect admission and exhaust of the motive fluid, the valve will be oscillated on the piston, thereby reducing wear and abrasion of the cylinder wall.

And the invention seeks, as a still further object, to provide an improved piston assembly embodying a novel mounting for the valve.

Other and incidental objects will appear thereinafter.

In the accompanying drawings:

Figure 1 is a side elevation of our improved engine.

Figure 2 is a plan view of the cylinder with the top cover plate removed.

Figure 3 is a transverse sectional view on the line 3—3 of Figure 2, looking in the direction indicated by the arrows.

Figure 4 is a longitudinal sectional view on the line 4—4 of Figure 3, looking in the direction indicated by the arrows.

Figure 5 is a view similar to Figure 4, on the line 5—5 of Figure 3, looking in the direction indicated by the arrows.

Figure 6 is a detail perspective view of the piston heads and the valve, the parts being disassembled but in proper relative position.

Figures 7, 8 and 9 are sectional diagrammatic views showing different positions of the steam inlet passages throughout a stroke of the piston.

In carrying the invention into effect, we employ a base 10 at one end of which are spaced upstanding bearings 11 and journaled by said bearings is a crank shaft 12 retained by removable bearing caps 13. Fixed to the crank shaft is a flywheel 14. Rising from the base in spaced relation to the bearings 11 is a block 15 to which is bolted a cross head guide 16, and slidable in said guide is a cross head 17. Extending between said cross head and the crank shaft 12 is a connecting rod 18.

Rising from the base 10 at the end thereof opposite the bearings 11 are spaced blocks 19 and mounted upon said blocks is a cylinder 20 provided at its ends with bosses 21 resting upon and secured to said blocks by cap bolts 22. Closing the cylinder at its ends are removable heads 23 and formed on the cylinder at opposite sides thereof are, as particularly shown in Figure 3, bosses 24 through which are provided elongated inlet ports 25. Bolted to the bosses 24 are cover plates 26 on which are formed elbows 27 having steam passages 28 communicating with said ports, and connected with both of the elbows 27 is, as particularly shown in Figure 2, a steam supply pipe 29. Formed on the cylinder 20, at the lower side thereof, is a boss 30 through which is provided an elongated exhaust port 31 and bolted to said boss is a cover plate 32 having an elbow 33 through which is provided an exhaust passage 34 communicating with said port. Preferably, an exhaust pipe 35 is screwed into the elbow. Formed on the cylinder at its upper side is a slotted boss 36 and overlying said boss is a cam plate 37 provided, as particularly shown in Figure 2, with a diagonally disposed diamond-shaped cam slot 38. Overlying the plate 37 is a cover plate 39 secured to the boss 36 by bolts extending through the cam plate so that said bolt serves to removably secure both plates in position.

Slidable in the cylinder 20 is a piston embodying a piston rod 40 which is slidably received through a stuffing box 41 upon one of the cylinder heads 23 and, at its outer end, is screwed into the cross head 17. Thus, the connection between the piston rod and the cross head is adjustable, and screwed upon the rod to coact with the cross head is, as shown in Figure 1, a nut 42 for locking the rod in adjusted position. As particularly shown in Figures 4 and 5 of the drawings, the rod is reduced to define spaced annular shoulders 43 near the inner end of the rod and abutting said shoulders are forward and rear heads 44 secured in position by nuts 45 screwed upon the rod. These nuts are adjusted to tightly clamp the heads between said nuts and the shoulders 43 so that the heads 44 are locked against rotation, and mounted upon the heads to coact with the wall of the cylinder are resilient rings 46. Formed in the inner sides of the heads in concentric relation to the rod are annular channels 47 and freely surrounding the rod between the heads is a cylindrical valve 48 provided at its ends with annular flanges 49 rotatably fitting in the channels 47. Thus, the flanges 49 form trunnions which journal the valve to freely oscillate between the heads 44 and, in this connection, it is to be observed that the valve is of a diameter but slightly less than the internal diameter of the cylinder so that while the valve closely fits the cylinder, still, the valve is free to turn. In the drawings, the clearance between the valve and cylinder is exaggerated for the sake of clarity. Fixed to the valve at its upper side is a radial arm 50 projecting into the cam slot of the plate 37 and journaled upon the upper end of said arm is a roller 51 to coact with the walls of said slot. Thus, as the piston reciprocates, the valve 48 will be oscillated and, of course, the impulse of the piston will be communicated to the cross head 17 and thence through the connecting rod 18 for turning the crank shaft 12 and flywheel 14.

Formed in the valve 48 are like diametrically arranged steam inlet passages indicated for convenience at 52 and 53 which extend parallel to the axis of the valve and, at their forward ends, open through the forward end of the valve while the rear ends of said passages are turned laterally and open through the periphery of the valve substantially midway between the ends thereof. Formed in the forward piston head 44 to cooperate with said passages are diametric inlet ports 54 and 55. The valve is further provided adjacent its lower side with an exhaust passage 56 which extends parallel to the axis of the valve to open through the rear end thereof while the forward end of the passage is turned laterally to open through the periphery of the valve substantially in a plane with the inner ends of the passages 52 and 53. As shown in Figure 4, the passage 56 is preferably provided with a liner 57 and formed in the rear piston head 44 to cooperate with the passage 56 is an exhaust port 58. Formed in the valve to open through the rear end thereof is a pair of diametric steam inlet passages 59 and 60 which are like the passages 52 and 53 but are staggered with respect thereto, and formed in the rear piston head 44 to cooperate with the passages 59 and 60 are steam inlet ports 61 and 62. The valve is further provided with an exhaust passage 63 which is like the passage 56 but opens through the forward end of the valve and is staggered with respect to the passage 56.

Preferably, a liner 64 is provided for the passage 63 and formed in the forward piston head 44 to cooperate with the passage 63 is an exhaust port 65.

Assuming now that the piston is, as shown in Figures 3 and 4, moving rearwardly, it will be seen that the inlet passages 52 and 53 are disposed to register at their inner ends with the steam inlet ports 25 and at their outer ends with the steam inlet ports 54 and 55 so that steam is admitted through said ports and passages in front of the piston for driving the piston rearwardly, while the exhaust passage 56 is disposed to register at one end with the exhaust passage 31 of the cylinder and at its opposite end with the exhaust passage 58 so that the steam behind the piston will thus be permitted to exhaust through said ports and passages to the atmosphere. Slightly before the piston reaches the end of its forward throw, the roller 51 of the arm 50 strikes the forward end wall of the slot 38 for turning the valve 48 to the right, as seen in Figure 3, so that the ports and passages just above noted, may function while the passages 59, 60, and 63 of the valve are turned away from the ports 61, 62 and 65 of the piston head. Similarly, slightly before the piston reaches the end of its rearward throw, the roller 51 strikes the rear end wall of the slot 38 for turning the valve to the left until, as suggested in Figure 5, the passages 59 and 60 are disposed to register at their inner ends with the ports 25 of the cylinder and at their outer ends with the ports 61 and 62 of the rear piston head, while the passage 63 of the valve is disposed to register at one end with the exhaust port 31 and at its opposite end with the exhaust port 65. Thus, steam will be admitted at the rear of the piston for driving the piston forwardly while steam in front of the piston will be permitted to exhaust to the atmosphere. Coincidently, the passages 52, 53 and 56 of the valve will be turned away from the ports 54, 55 and 58 of the piston heads. It will accordingly be seen that the valve will function, upon the forward throw of the piston, to admit steam behind the piston at opposite sides of the valve as well as release the steam in front of the piston while, upon the rearward throw of the piston, the valve will function to admit steam in front of the piston at opposite sides of the valve and, at the same time, release steam behind the piston. However, attention is directed to the fact that, as diagrammatically shown in Figures 7, 8 and 9 of the drawings, when the valve is turned at the end of the throw of the piston in either direction, the steam inlet ports which are brought into alinement with the inlet ports 25 of the cylinder and are to function upon the movement of the piston in the opposite direction, as the case may be, do not immediately register with the cylinder ports but, on the contrary, are covered at their outer ends by the cylinder wall so that the crank shaft is permitted to cross dead center before the live steam is admitted for reversing the movement of the piston.

Having thus described the invention, what we claim is:

1. An engine including a cylinder, a piston reciprocable therein, an oscillatory valve carried by the piston between the ends thereof and independently movable thereon for controlling the admission and release of a motive fluid through the ends of the piston to and from the cylinder at opposite ends of the piston, a cam plate on the cylinder having a cam slot, a cover plate overlying the cam plate, removable means common to both plates for securing said plates to the cylinder, and a radial arm carried by the valve between the ends thereof and having its free end playing in said cam slot to coact with the walls thereof for oscillating the valve.

2. An engine including a cylinder, a piston reciprocable therein, a valve carried by the piston between the ends thereof and provided at its ends with trunnions engaging in the ends of the piston and journaling the valve for independent oscillatory movement to control the admission and release of a motive fluid to and from the cylinder at opposite ends of the piston, and means for oscillating the valve.

3. An engine including a cylinder, a piston rod having heads fixed thereon to form a piston reciprocable in said cylinder, an oscillatory valve encircling the piston rod between the heads and journaled upon said heads and independently movable for controlling the admission and release of a motive fluid to and from the cylinder at opposite ends of the piston, and means for oscillating said valve.

4. An engine including a cylinder, a piston having heads fixed thereon to form a piston reciprocable in said cylinder, the heads being provided with annular channels, a valve accommodated between the heads and provided at its ends with annular flanges rotatably fitting in said channels and supporting the valve for independent oscillatory movement to control the admission and release of a motive fluid through the piston heads to and from the cylinder at opposite ends of the piston, and means on the cylinder and the valve for oscillating said valve.

5. An engine including a cylinder having inlet and outlet ports, a piston rod having heads fixed thereon to form a piston reciprocable in said cylinder, the heads being formed with inlet and outlet ports, an oscillatory valve journaled between the heads and provided with inlet and outlet passages to register with the ports of the cylinder and the ports of the heads for controlling the admission and release of a motive fluid to and from the cylinder at opposite ends of the piston, and means for oscillating said valve.

In testimony whereof we affix our signatures.

HENRY R. SHOOPMAN. [L. S.]
SABURO SHINDO. [L. S.]